United States Patent
Li et al.

(10) Patent No.: US 11,117,106 B2
(45) Date of Patent: Sep. 14, 2021

(54) SOLAR ACTIVATED LOW VOLTAGE FLOATING AND LAND BASED WATER AERATION SYSTEM

(71) Applicant: LW Engineering LLC, Sugar Land, TX (US)

(72) Inventors: Wenjun Li, Sugar Land, TX (US); Yichao Hao, Missouri City, TX (US); Han Zhang, Missouri City, TX (US)

(73) Assignee: LW Engineering LLC, Sugar Land, TX (US)

( * ) Notice: Subject to any disclaimer, the term of this patent is extended or adjusted under 35 U.S.C. 154(b) by 267 days.

(21) Appl. No.: 16/381,587

(22) Filed: Apr. 11, 2019

(65) Prior Publication Data

US 2020/0324260 A1    Oct. 15, 2020

(51) Int. Cl.
*B01F 3/04* (2006.01)
*C02F 1/74* (2006.01)
*B01F 15/00* (2006.01)
*H02S 30/10* (2014.01)

(52) U.S. Cl.
CPC .... *B01F 3/04106* (2013.01); *B01F 15/00558* (2013.01); *C02F 1/74* (2013.01); *H02S 30/10* (2014.12)

(58) Field of Classification Search
CPC .................... B01F 3/04; B01F 3/04106; B01F 2003/04198; C02F 1/74
See application file for complete search history.

(56) References Cited

U.S. PATENT DOCUMENTS 9,290,398 B2 *  3/2016  Burton ................ B01F 3/04241

FOREIGN PATENT DOCUMENTS

CN          205756611 U  * 12/2016  ............. A01K 63/04

* cited by examiner

*Primary Examiner* — Robert A Hopkins
(74) *Attorney, Agent, or Firm* — Timothy T. Wang; Ni, Wang & Massand, PLLC (57) ABSTRACT

The aerator system incorporates a land-based or water-based floating solar activated water aeration system with integrated linear diaphragm air compressor and controller to provide improved oxygen addition into water. The system uses low voltage and an advanced controller with max power point tracking (MPPT) technique, which converts the solar panel photovoltaic low voltage DC to low voltage AC and allows power generated from each solar panel to be fully utilized.

19 Claims, 11 Drawing Sheets

SOLAR ACTIVATED LOW VOLTAGE FLOATING AND LAND BASED WATER AERATION SYSTEM

TECHNICAL FIELD

The instant disclosure relates to an improved water aeration system which operates at low voltage. More specifically, it relates to a system of adding air into water which helps promote fish and plant growth, while reducing algae growth, and helps improve aerobic degradation of pollutant components.

BACKGROUND

Water aeration is the process of adding air into water. Sufficient quantity of oxygen in the water is essential to promote desired fish, plant, and microbial growth, while reducing algae growth. Many organisms in water (like fish, plants, and bacteria) need dissolved oxygen to thrive. It is their way of "breathing" under water. While bottom feeders and crabs may survive on minimal amounts of oxygen (1-6 mg/L), shallow water creatures, like fish, require much higher levels (4-15 mg/L) to live. Lack of sunlight and decomposition of dead organisms also cause the deeper water depths to be void of oxygen.

Under the conditions like high temperature, low wind or ice covered in winter, water oxygen level depletion is accelerated because of a lack of exchange on the surface. When the level is unbalanced, algae and other plants create a further demand of dissolved oxygen at the bottom of the pond, which may destroy the habitat of marine life. Aeration not only adds oxygen into the water, but also accelerates the decomposition of dead organisms and helps remove the toxic carbon dioxide from water. It is common for a fish farmer to use an aeration system to improve fish production, since a dense fish population demands more oxygen in the water.

Another application of aeration is for wastewater treatment by improving the aerobic degradation of pollutant components. This type of biological wastewater treatment system uses microorganisms that occur naturally in wastewater to degrade contaminants. Aeration increases water oxygen level which promotes the microbial growth. The microbes feed on the organic material, forming flocks which may easily settle out. Without sufficient oxygen, biodegradation may occur under septic conditions which are slow, odorous, and yield incomplete conversions of pollutants. Some of the biological processes convert hydrogen and Sulphur to form hydrogen sulfide and transform carbon into methane. Carbon may also be converted into organic acids that create low pH conditions and make the water more difficult to treat and promote odor formation.

Oxygen in the water may be restored by injecting air at predetermined depths (subsurface aeration). It is more effective and efficient to increase the water oxygen level by injecting air with diffusers since small air bubbles have more contact surface to be dissolved in water. Injecting air with diffusers also promotes water circulation around the diffusers.

Solar powered subsurface water aerations have been disclosed in the prior art. One example of current water aeration systems consists of a floating base on which a pump, control and a solar panel are mounted and has an air tube with openings at its distal end extending from the pump and floating base to release air bubbles into the water, as illustrated by U.S. Pat. No. 4,906,359.

Another example of current water aeration systems involves a land based solar aeration system with commercial air pump and inverter installed in the encasement which is integrated to the solar panel mounting fixture, as illustrated by U.S. Pat. No. 9,920,398.

Such prior solar activated aeration systems all have drawbacks. They mostly describe mounting methods with a commercially available pump, control/inverter and/or battery. Overall system size, weight and cost are higher without integrating them together. A commercial control/inverter is not designed for aeration application directly, which leads to low efficiency and requires larger solar panels to operate. A commercial air pump has higher voltage alternating current (AC) operation conditions, which have safety concerns during installation or maintenance service around water features. Further, the floating systems are difficult to maintain exact location to have the single solar panel facing southward, considering wind and water movement. The material selection of the floating base is not suitable for long time deployment on water. The land-based system comes with a mounting fixture and solar panel, which eliminates customers to choose other commercially available mounting methods or solar panel at a lower cost.

SUMMARY

In one example of a landed-based water aeration system, comprising at least one of, a pole secured to a portion of land, a frame coupled to the pole, a solar panel coupled to the frame, an encasement coupled to the pole, a controller housed within the encasement, an air compressor housed within the encasement and electrically coupled to the controller, one or more diffusers submerged under water and an air hose pneumatically coupling the air compressor and the one or more diffusers.

In another example of a floating aeration system, comprising at least one of, a floating base, an anchor system securing the floating base, a metal frame affixed to the floating base, a metal pole affixed to the metal frame, a plurality of solar panels affixed to the metal frame to provide electrical power, an encasement coupled to the metal pole, a controller housed within the encasement, an air compressor housed within the encasement and electrically coupled to the controller, one or more diffusers submerged under water, an air hose pneumatically coupling the air compressor and the one or more diffusers and a lightning rod cap coupled to the metal pole.

BRIEF DESCRIPTION OF THE DRAWINGS

Embodiments of the disclosure will now be described, by way of example, with reference to the accompanying drawings, wherein.

DETAILED DESCRIPTION OF THE INVENTION

It should be understood that various changes and modifications to the presently preferred embodiments described herein will be apparent to those skilled in the art. Such changes and modifications may be made without departing from the spirit and scope of the present invention and without diminishing its intended advantages. It is therefore intended that such changes and modifications be covered by the appended claims.

Features Shared by the Land-Based and Water-Based Aeration Systems

A solar activated water aeration system is provided to improve oxygen addition into water using low voltage and an advanced controller utilizing a max power point tracking (MPPT) technique, which allows power generated from each solar panel to be more efficiently utilized.

A solar activated aeration system with integrated linear diaphragm air compressor drive unit and controller to provide oxygen into the body of water is disclosed. In a preferred embodiment, direct current (DC) electricity is generated from solar panels and is converted into low voltage AC electricity to power the modified linear diaphragm air compressor safely. The system operates without battery or other energy accumulators, but they may be added if longer operation time is needed. The controller has a DC booster, MPPT DC/AC inverter and micro control processor (MCP) electronics integrated on the same Print Circuit Board (PCB). The sealed encasement has electronic components inside, outside wire terminals matching solar panel, and air compressor connectors. Various brand and power output solar panels may be selected as long as they meet air compressor basic power requirements. The types of air compressors that may be utilized in this system are positive displacement air compressors such as reciprocating compressors, ionic liquid piston compressors, rotary screw compressors, rotary vane compressors, rolling piston compressors, scroll compressors, diaphragm compressors, and dynamic air compressors such as, air bubble compressors, centrifugal compressors, diagonal or mixed-flow compressors and axial-flow compressors and the like. The preferred compressor for this application is a low voltage linear diaphragm air compressor.

In the instant application, the water aeration system operates at low voltage. A battery or other energy accumulator may be added for longer operating time in the day when the power output of selected solar panels is higher than the consumption of the air compressor.

The aeration system utilizes a controller integrated DC to DC voltage booster, a Max Power Point Tracking (MPPT) DC to AC inverter and a Micro Control Processor (MCP) electronics on a Print Circuit Board (PCB). It is applicable to a wide range of solar panels without the need for a battery or other energy accumulators. One function of the controller is converting the solar panel photovoltaic low voltage DC to low voltage AC for driving the air compressor. The transformer to high voltage AC used in most inverters is eliminated to improve the overall efficiency. The MCP in the controller is programmed to detect the solar panel Max Power Point DC voltage, and the booster then increases it to 45 V DC, and then the inverter converts it to 30 V AC pure sine wave. The output AC has a variable frequency controlled by MCP based on the power factor, which is affected by the air compressor design and operation conditions, to ensure the air compressor operates at the highest efficiency. The other functions of the controller are to monitor the aeration system working conditions to protect main components, diagnose, and report any defects. Based on the defined conditions of the solar panel and air compressor sun light strength and air output pressure range, the controller may automatically turn on/off the system. The controller outside indication lights may guide quick trouble shooting of a main components failure. Internal memory also records system performance for further analysis and improvement. The controller may be expanded to multiple solar panels which connect in parallel.

A fully sealed encasement houses controller electronic components to provide protection from dust and humidity. The metal encasement also serves as a heat sink to reduce the temperature of electronics. The encasement's external power input wires have matching MC4 solar panel connector to the solar panel and power output wires matching the air compressor terminals for safety and easier installation.

The aeration system has a low voltage linear diaphragm air compressor with modified winding number to operate at 30 V condition. Instead of operating at 115 or 230 V AC, the air compressor electrical coil winding number is adjusted to have the same performance at low voltage. This will ensure the safety when the whole system operates at a lower voltage.

A compact encasement houses the controller and air compressor. Overall size and weight is reduced since the compressor only has the driver unit. A replaceable air inlet filter at the bottom of the encasement provides clean air to the compressor. Air flows around the sealed controller and compressor winding coils to help cool the electronics before being compressed in the chamber on both sides of the driver unit to the air outlet. The air outlet and power cord are also located at the bottom of the encasement. With the top and sides fully sealed, it provides another layer of protection to the internal compressor and controller.

Similar to most aeration systems, diffusers quantity is based on the size of the water feature. They are connected at the end of the air tube and submerged to the bottom of the water to improve the oxygen level.

Oxygen levels drop the most at high temperatures during the daytime, which favor the solar panel aeration system. The system is designed without a battery or other energy accumulator to minimize the cost and maintenance. Battery or other energy accumulator options may be easily added if longer operation time or other use of power is needed.

The whole system, land-based or water-based system, operates at low-voltage conditions to improve the efficiency and operation/maintenance safety. More than 90% conversion efficiency reduces the wasted power, which will generate heat and shorten the electronic component life/performance. It also eliminates the low voltage to high voltage AC transformer which requires extra fan or head sink used on regular DC/AC inverters. A self-diagnose electronic module is integrated together with a failure indicator to ease the troubleshooting. Users may choose solar panels of different brands and power outputs as long as they meet the air pump power requirements. However, a high output solar panel will generate enough power to operate the compressor for longer period of time versus a lower power output panel, considering differing sunlight during the day. The system monitors the solar panel output and adjusts an input voltage to increase power generation.

Figure 2:
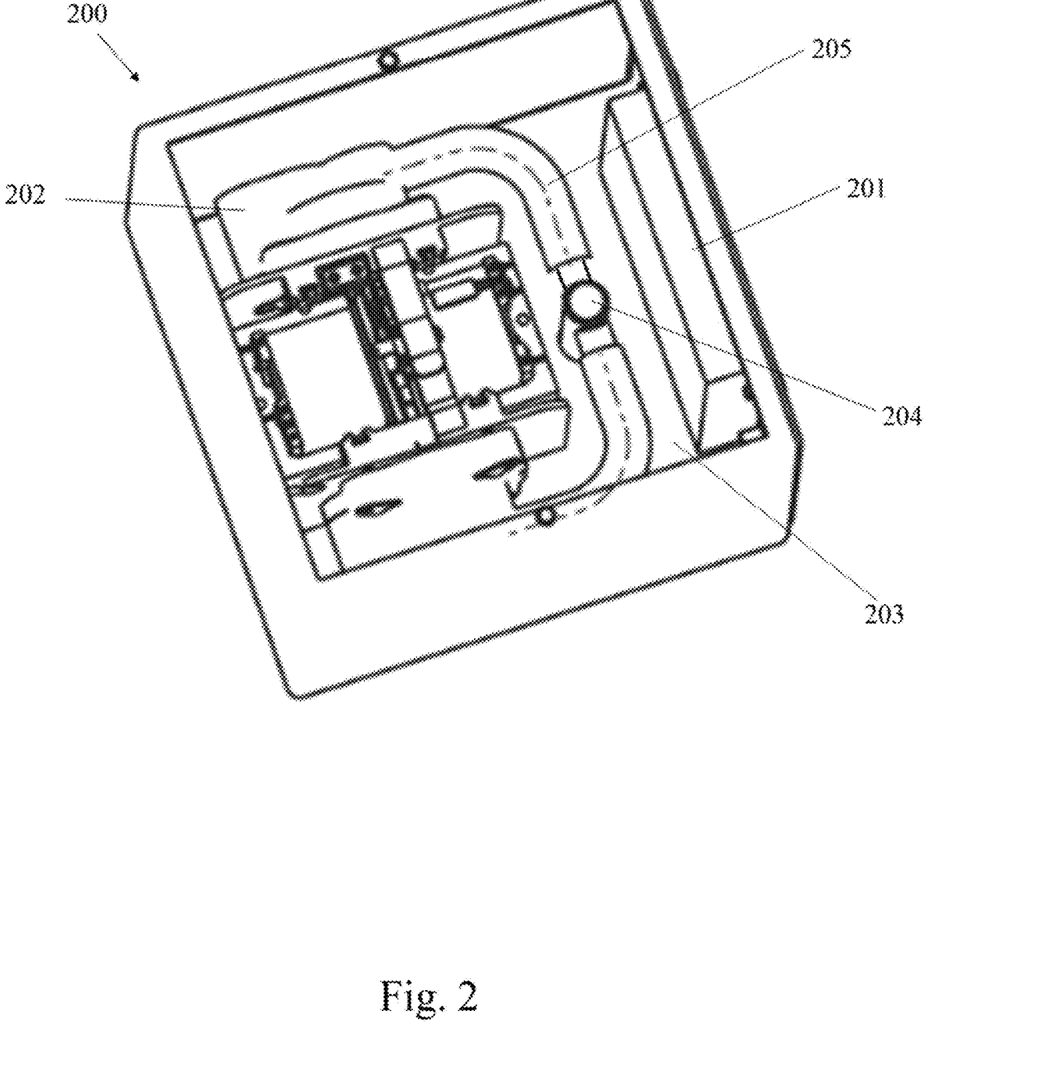
FIG. 2 shows the compact encasement for the controller and air compressor incorporated in the system.

FIG. 2 shows the internal components of encasement (200). Controller (201) is secured to the side of encasement (200). The air compressor drive unit (202) is mounted to base plate (203) with isolators (not shown). L-shaped rubber tubes (205) connect on both sides of the compressor chamber of driver unit (202) to the T-shaped air connector (204). The encasement has an air compressor outlet. Encasement (200) with a top cover (not shown) is secured with a screw on top and sealant to prevent rain water and other environmental damage.

Figure 3:
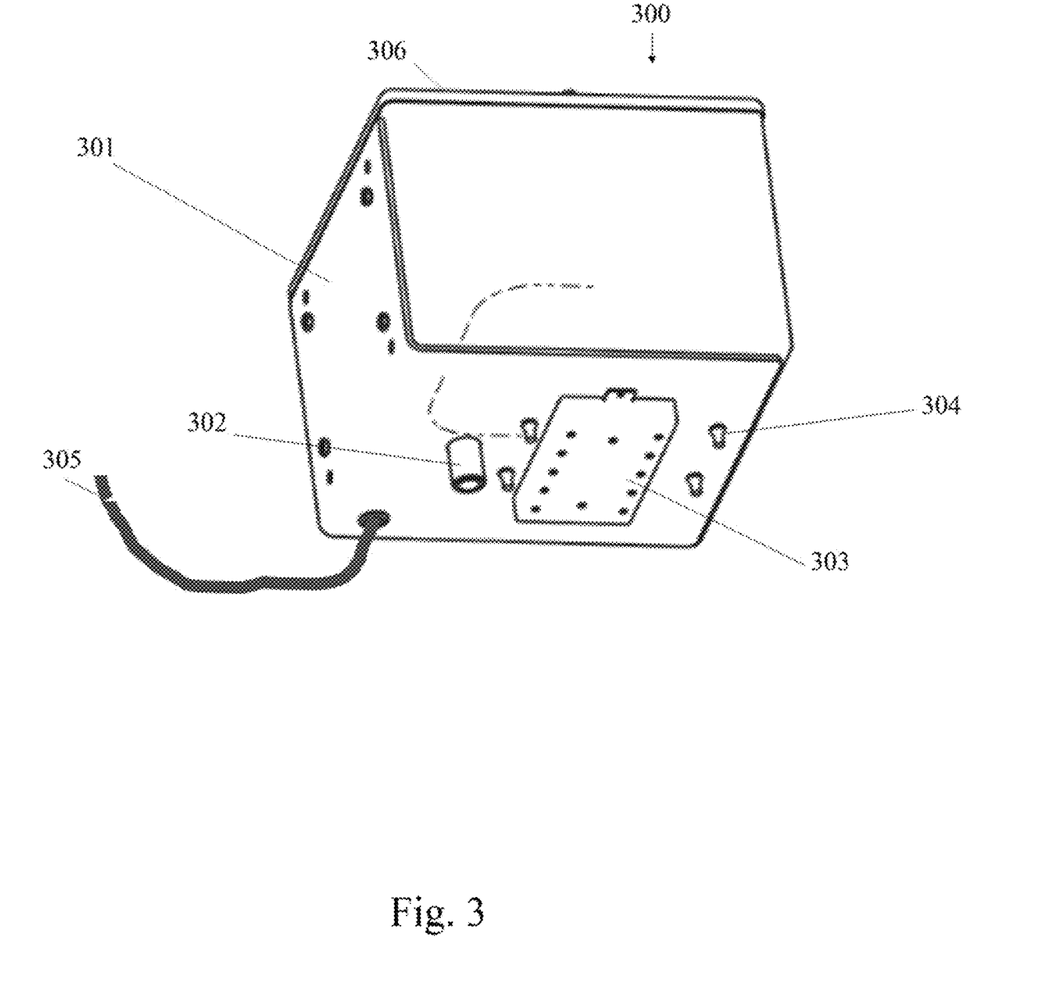
FIG. 3 shows another embodiment of the compact encasement showing the power cords and air intake/outlet incorporated in the system.

FIG. 3 depicts a bottom view of encasement (300) showing encasement base plate (301). Outside air goes through bottom replaceable air inlet filter (not shown), and flow around encasement (300) internal electronic components before being compressed to single outlet (302). The air inlet filter is inside the filter cover (303). Power cord (305) to the solar panel also comes out of the bottom of encasement (300) at a power cord inlet with MC4 connectors matching standard solar panel power connectors. The air compressor drive unit is mounted to base plate (301) with isolators (304). Encasement (300) has a secured cover (306) to prevent rain water and other environmental damage.

Figure 4:
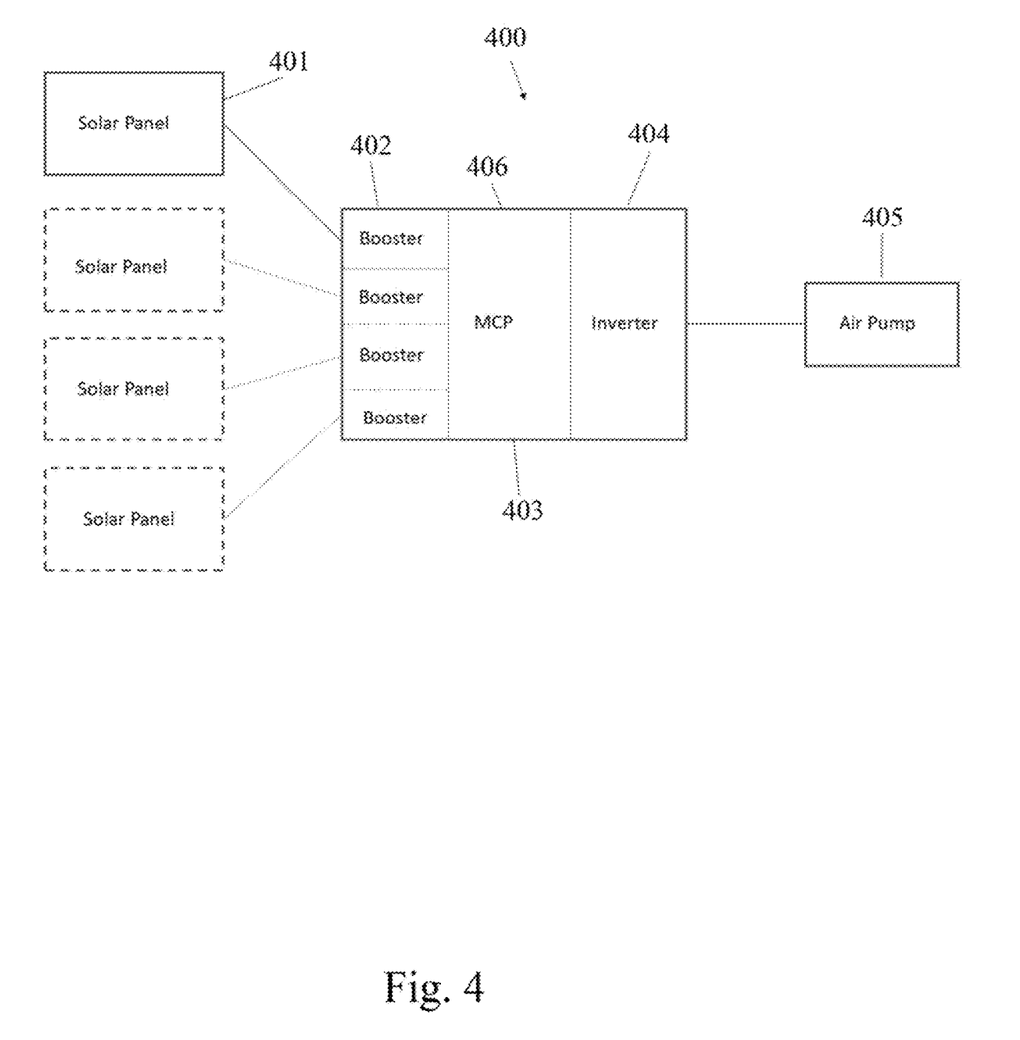
FIG. 4 depicts a schematic of the aeration system.

FIG. 4 is a schematic of the system electronics as shown generally (400).

Single or multiple solar panels (401) connect to the integrated controller (406) with solar panels MC4 connectors. The solar panel controller is made of three main sections, the DC to DC booster (402), micro control processor (403), and DC to AC inverter (404). They are all integrated on the same print circuit board with all electrical components. Firmware programmed in the MCP (403) controls the booster (402) to detect maxim power point (MPPT) voltage of each solar panel before increasing the volts to 45 V DC. Doing this, controller (406) may utilize as much power of each solar panel to drive the air pump (405) regardless of the output which is affected by sunlight strength, angle and other factors. Micro control processor (403) controls inverter (404) to convert the 45 V DC to 30 V AC to operate the linear diaphragm air compressor. Depending on various compressor performances, controller (406) output voltage and frequency are adjusted by micro control processor (403) based on the phase of voltage versus amps to achieve the highest efficiency.

Features of the Land-Based Aeration System

In a preferred embodiment for land-based application of the water aeration system, the compact encasement, which houses the linear diaphragm air compressor drive unit and control/inverter electronics system, may be attached to a pole by a mounting bracket to a portion of land. The mounting bracket also supports the upper frames which may be adjusted for various size solar panels. An air inlet filter, outlet connector, and electrical harness all come out from the base plate to prevent dust and rain getting inside the encasement. The air outlet from the encasement is connected to a hose with single or multiple diffusers attached to the other ends that are submerged under water.

The land-based aeration system consists of a compact solar panel mounting fixture for land-based applications. The fixture has an upper frame and mounting bracket. The top of the mounting bracket is bent 30 to 45 degrees to define the solar panel tilted angle. It is tightened to a metal or wood pole with two U-shaped bolts. The upper frame has slotted vertical frame rails and horizontal frame rails bolted together. The slotted vertical frame rails have slots to slide the mounting blocks for fitment of different sizes of solar panels before tightening. The frame and mounting bracket are also bolted together.

Figure 1:
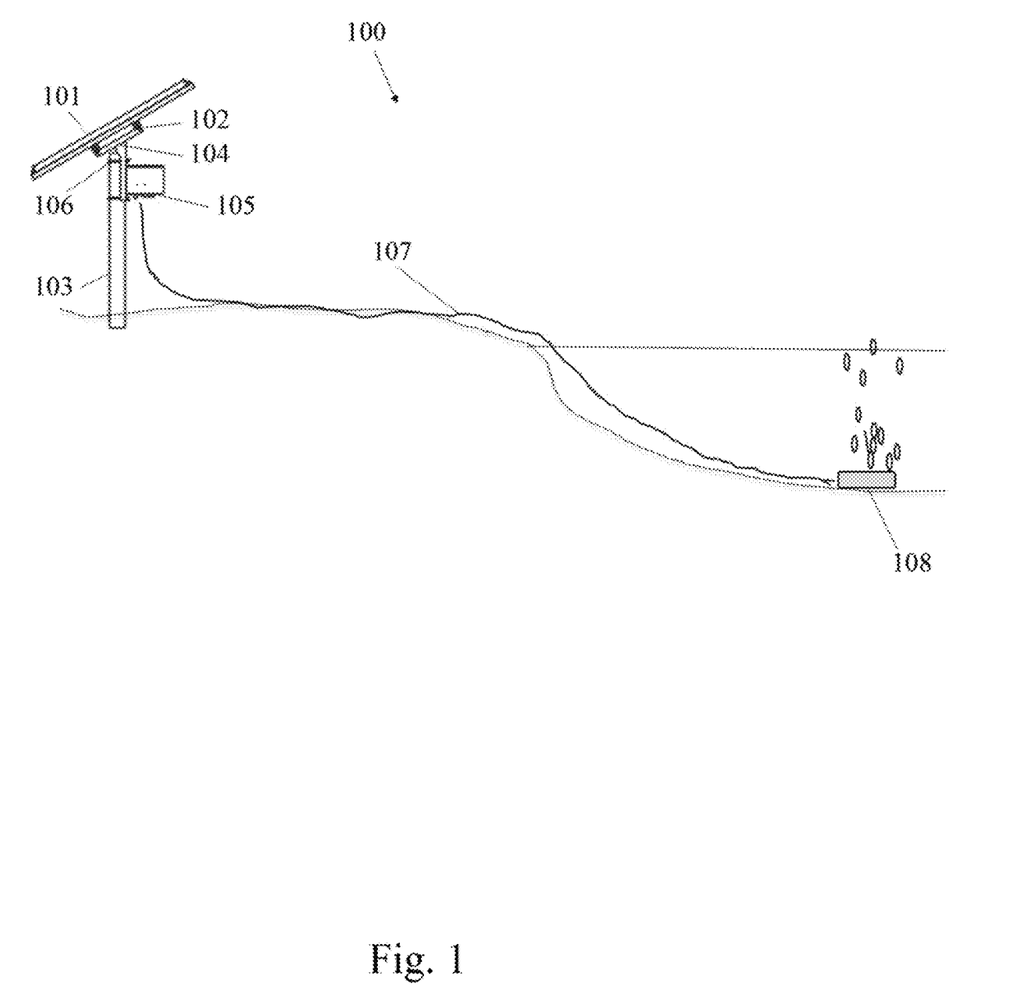
FIG. 1 shows a preferred embodiment of the land based aeration system.

With respect to FIG. 1 of the drawings, a preferred embodiment of the basic land based aeration system for carrying out the process of adding oxygen to water is shown generally as (100). Solar panel (101) is supported by upper frame (102) and mounted to pole (103) with mounting bracket (104). Encasement (105) with controller and air compressors inside is attached to mounting bracket (104). Mounting bracket (104) is tightened to pole (103) with two U-shaped bolts (106). Air hose (107) has one side connected to the outlet at encasement (105) and other end connected with single or multiple diffusers (108). Air hose (107) may be buried underground to prevent damage. Pole (103) may be metal or wood and secured on ground location where it has the most sunlight during the day. Diffusers (108) may be sunk with weights to a preselected area. Solar panel (101) generates energy to operate the aeration system. It is mounted to the top of pole (103) and adjusted to have it facing southward to gather most of the sunlight during the day.

Figure 5:
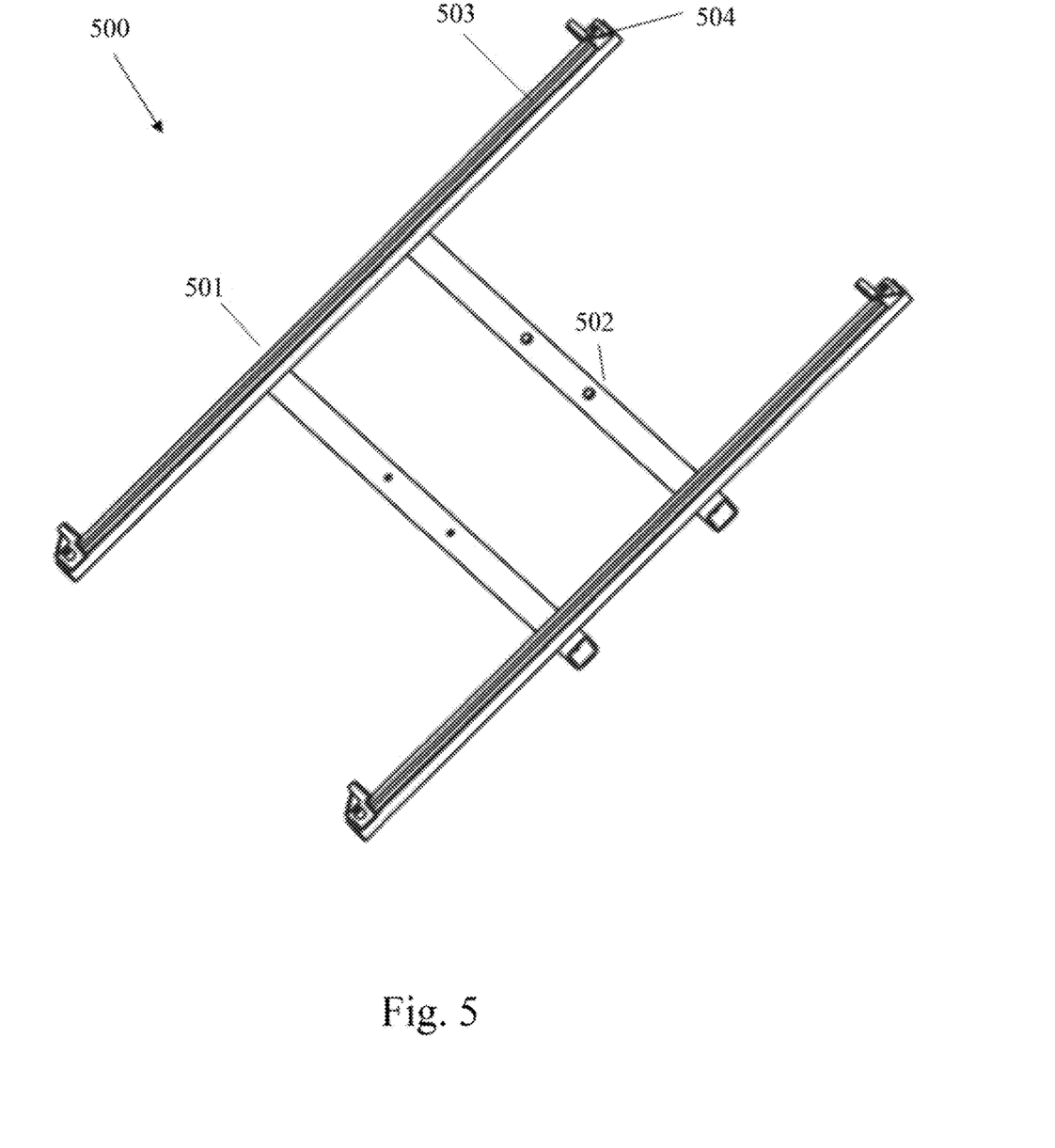
FIG. 5 depicts an embodiment of the upper frame with an adjustable edge lock for solar panel incorporated in the system.

FIG. 5 depicts the upper frame (500). The upper frame (500) has a slotted vertical frame rail (501) bolted to a horizontal frame rail (502). Slotted vertical frame rail (501) has an opening slot (503) to slide the adjustable edge lock (504) to fit various sizes of solar panels.

Figure 6:
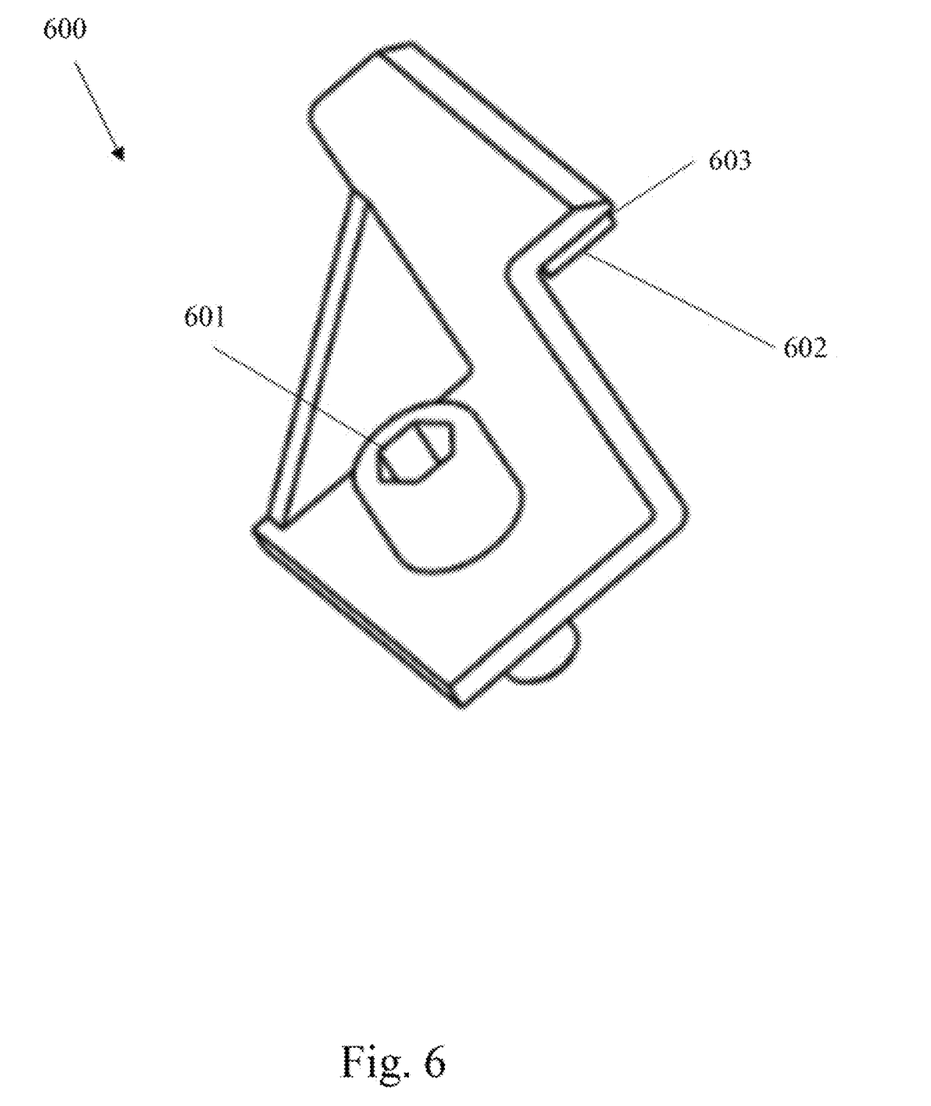
FIG. 6 depicts an embodiment of the Z-shaped adjustable edge lock incorporated in the system.

FIG. 6 depicts the adjusted edge lock (600) secured with bolt (601). It is Z-shaped with a layer of rubber (602) under upper clamp (603) to compensate any dimension variation of solar panels.

Figure 7:
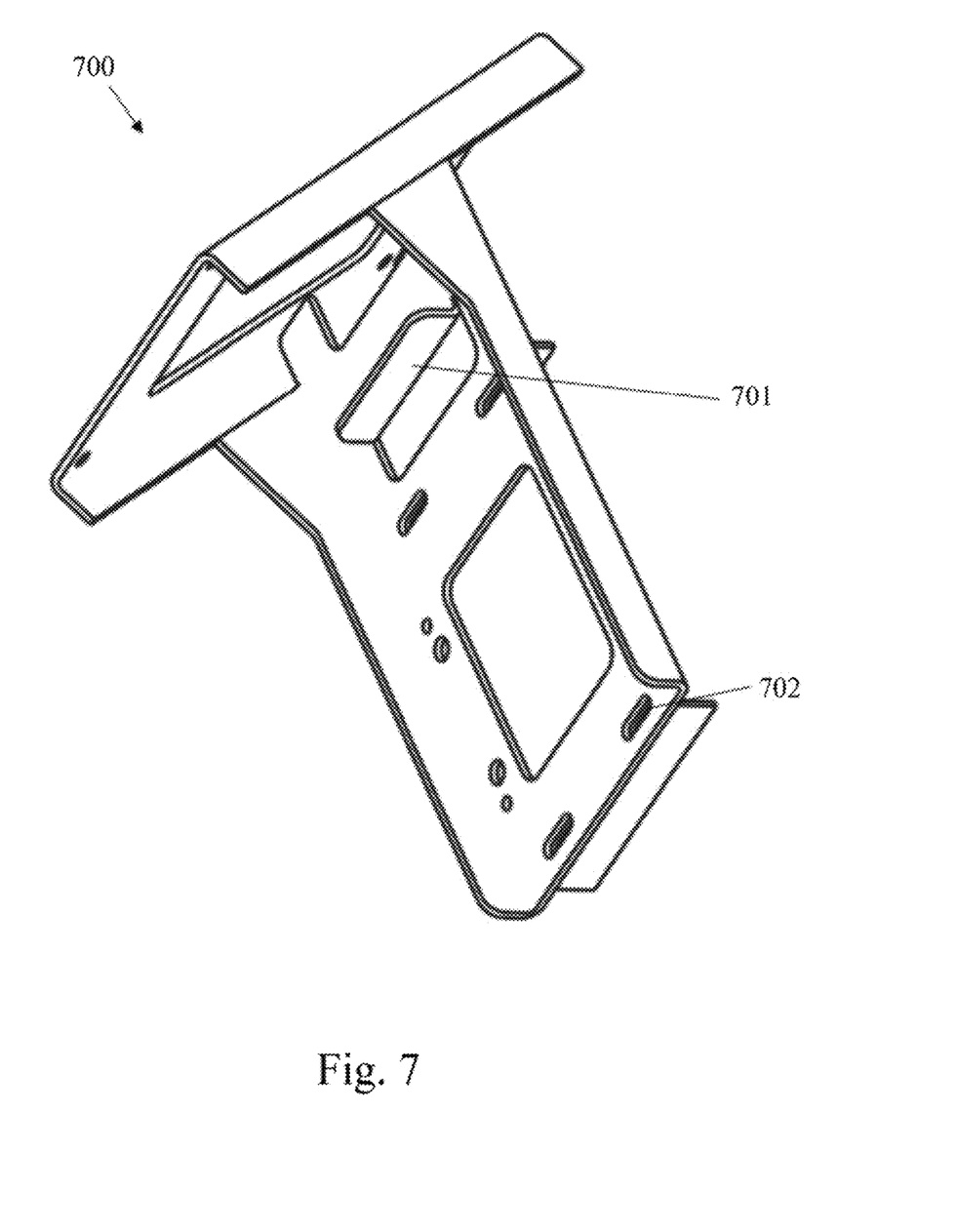
FIG. 7 shows an embodiment of the mounting bracket to support the upper frame and encasement incorporated in the system.

FIG. 7 depicts a mounting bracket (700) which is bolted to the horizontal frame rail of the upper frame of the land based aeration system. Mounting bracket (700) is tilted 30 to 45 degrees depending on the location of the aeration system. Stopper (701) is bent inward to locate the solar panel with upper frame to the top of the center pole, which the encasement and solar panel are attached, of the system. Horizontal slots (702) fit different diameter U-shaped bolts for various size wood, metal or fiberglass center poles.

Features of the Water-Based Aeration System

In a preferred embodiment for water-based application of the water aeration system, the floating aeration system, which has the same compact encasement inside, is deployed directly on the water. It is anchored to the pre-selected location that has most of the sun light without need to be rigidly facing a certain direction. The base of the floating system, which is made of polyethylene plastic, supports the upper frame that is shaped like a pyramid with multiple sides. Solar panels, which may be rectangular, triangular, or trapezoidal, are mounted to the outside faces of the upper frame directly or indirectly. Each solar panel outlet is connected parallel to the controller. Because of the advanced controller with MPPT technique, power generated from each panel may be fully utilized. Similarly to the land-based application, an air hose connects with the encasement and is extended to a predefined depth under water with diffusers.

The inventive aeration system is a floating aeration system. The air compressor and controller encasement is mounted to the center metal pole with U-shaped bolts. The metal pole is secured to the metal base plate with floating blocks underneath, which also support the pyramid-shaped solar panels. The solar panels are mounted to the outside faces of the encasements directly or indirectly. The upper frame with solar panels is secured by a polyethylene plastic float base. The center metal pole's lower portion is submerged under water, which houses an air hose, and on the outside is an attached weight to lower the aeration system center of gravity. The floating system is anchored with two or more cables and at least two anchors. The air hose is submerged under water through the middle of the center metal pole with single or multiple diffusers. The air hose may be tightened with anchor cables. The floating aeration system is deployed to the location where it has the most sunlight but does not need to be rigidly facing any direction.

With the water-based aeration system, air hoses with diffusers are submerged underwater from the center opening of the floating base. The air hoses and diffusers are affixed to or wrapped around the anchor cable, which extends to the bottom of the water. Depending on the size of the water feature, a single air outlet with a diffuser at the end of the PVC pipe may be directly extended to the water.

Figure 8:
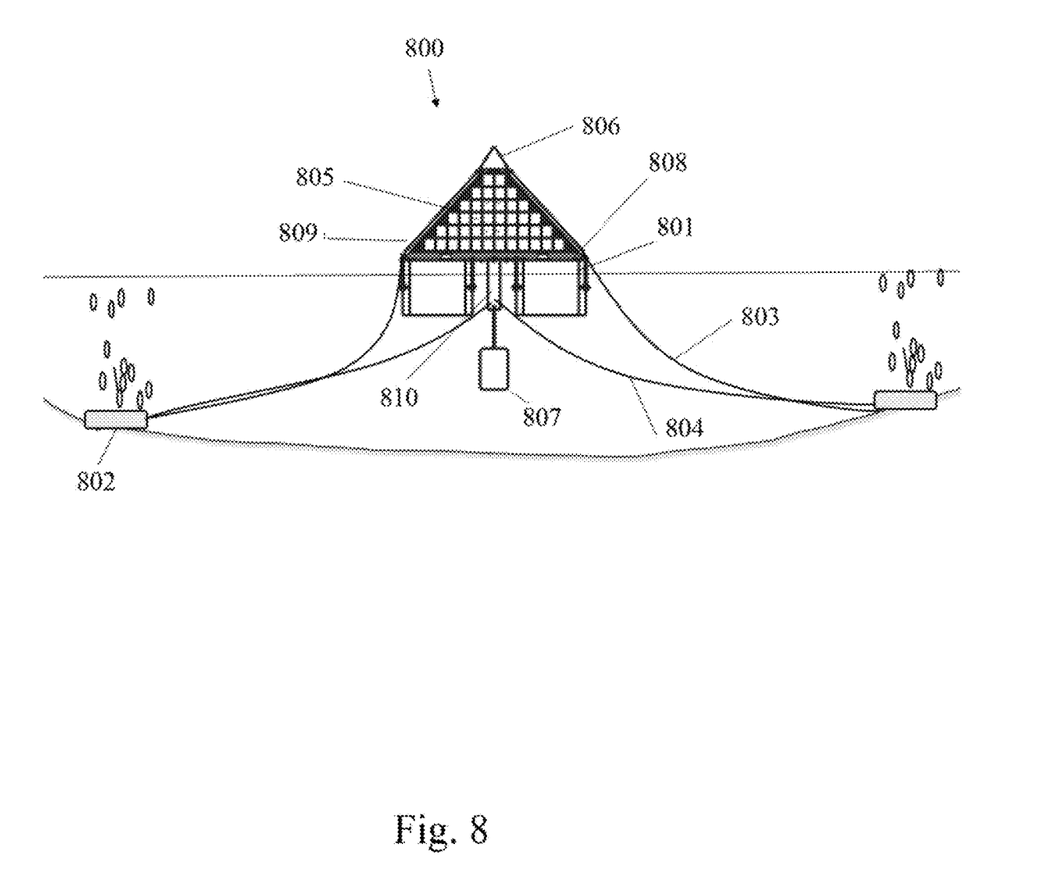
FIG. 8 depicts a preferred embodiment of a floating aeration system.

FIG. 8 depicts a preferred embodiment of the basic water based aeration system for carrying out the process of adding oxygen to water, shown generally as (800). The floating base (801) is made of polyester which may handle UV and humidity. It is bolted to mounting frame base (808). The floating system is located with anchors (802) to the bottom of the water feature. Anchor cable (803) is wrapped with air hose (804) before dropped to the bottom. The length of anchor cable (803) should be at least seven (7) times the water depth. Solar panels (805) are mounted to the faces of frame (809), which is shaped like a pyramid. The top of floating base (801) is covered with cap (806) to fend off birds and function as a lightning rod to protect the electronic components. Counter weight (807) is attached directly or indirectly to center metal pole (810) under water to lower the center of gravity. This is to ensure the system is stable under extreme weather conditions.

Figure 9:
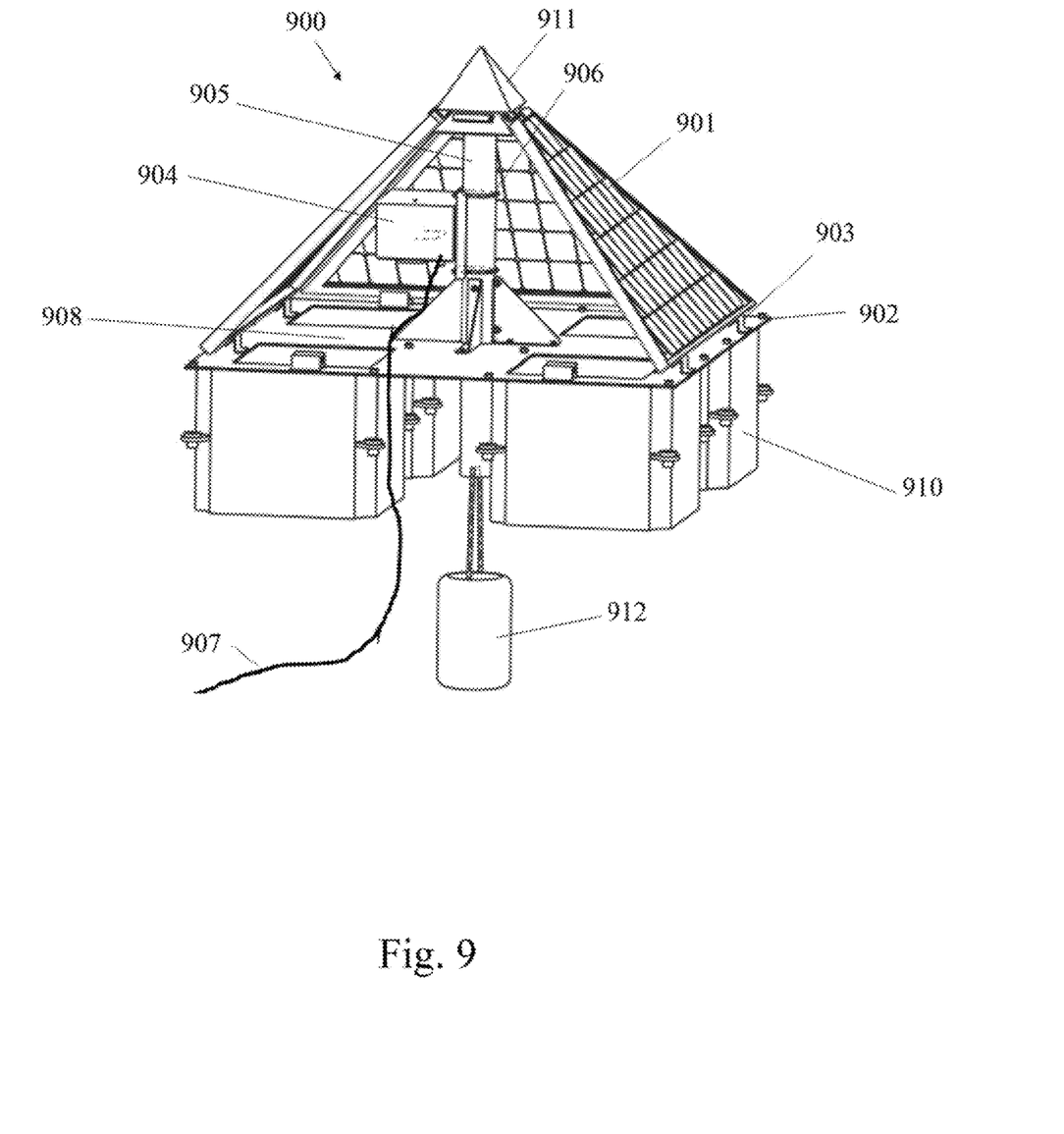
FIG. 9 depicts the internal mounting of the floating aeration system incorporated in the system.

FIG. 9 shows a detailed depiction of the inside of the floating aeration system, shown generally (900). Four trapezoid solar panels (901) are secured to the mounting frame (902) with Z-shaped brackets (903) at top and bottom. Encasement (904) is mounted to center metal pole (905) with U-shaped bolts (906). Power cords from solar panels are connected with encasement input power connector. Air hose (907) from bottom of encasement (904) extends through base (908). Four floating blocks (910) are secured to base (908). Cap (911) is snapped to the top of the system. Counter weight (912) is attached directly or indirectly to center metal pole (905) to lower the center of gravity.

Figure 10:
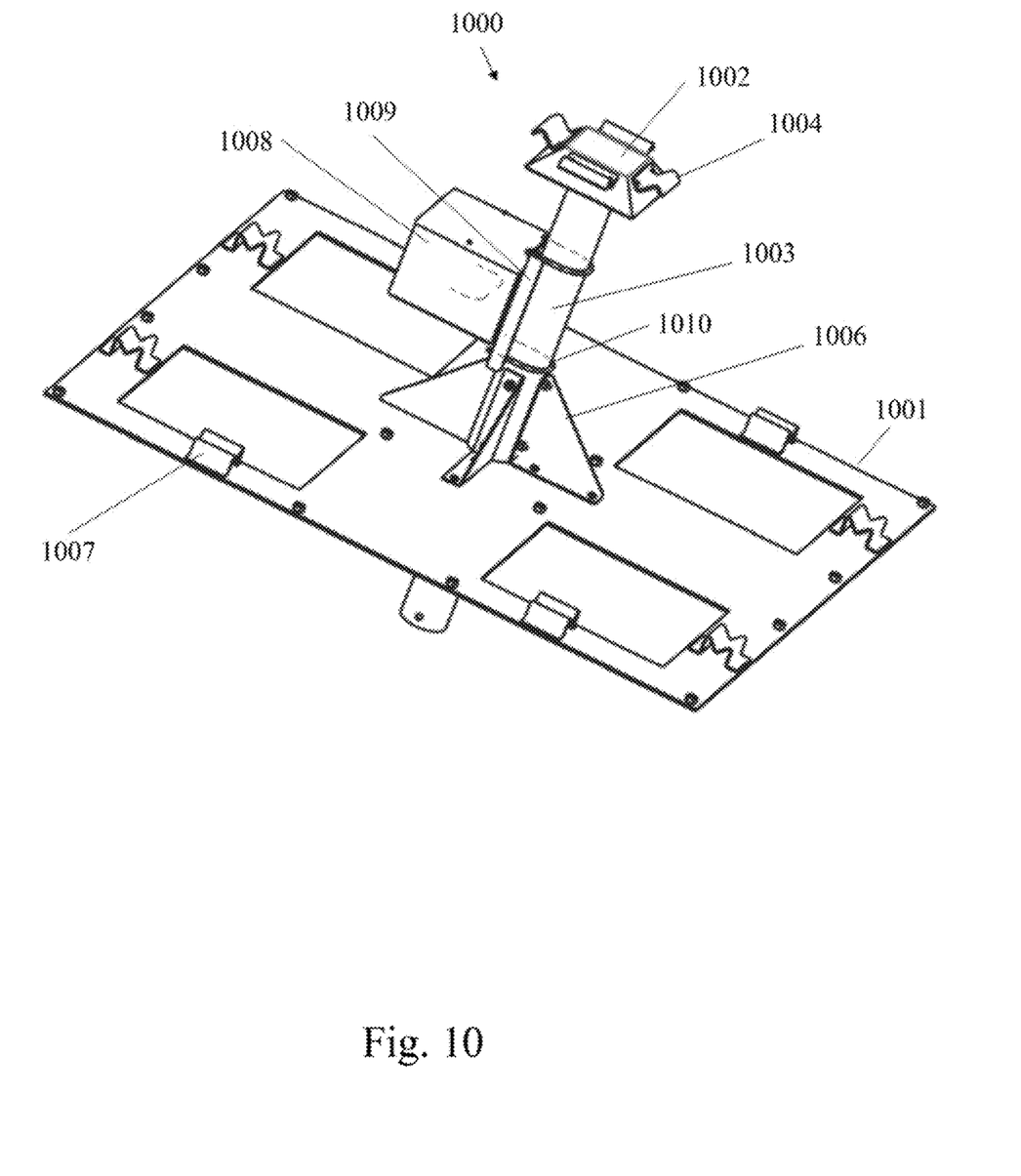
FIG. 10 shows the mounting frame and center metal pole structure incorporated in the system.

FIG. 10 shows in detail mounting frame (1000). Top plate (1002) is welded to center metal pole (1003). Four Z-shaped brackets (1004) are secured to the trapezoid faces of the top plate (1002) to locate the solar panels' upper frame. Center metal pole (1003) is mounted to base (1001) with supports (1006). Brackets (1007) are secured to base (1001) to locate the lower frame of the solar panel. Air compressor and controller encasement (1008) is secured to bracket (1009) with U-shaped bolts (1010) to center metal pole (1003).

Figure 11:
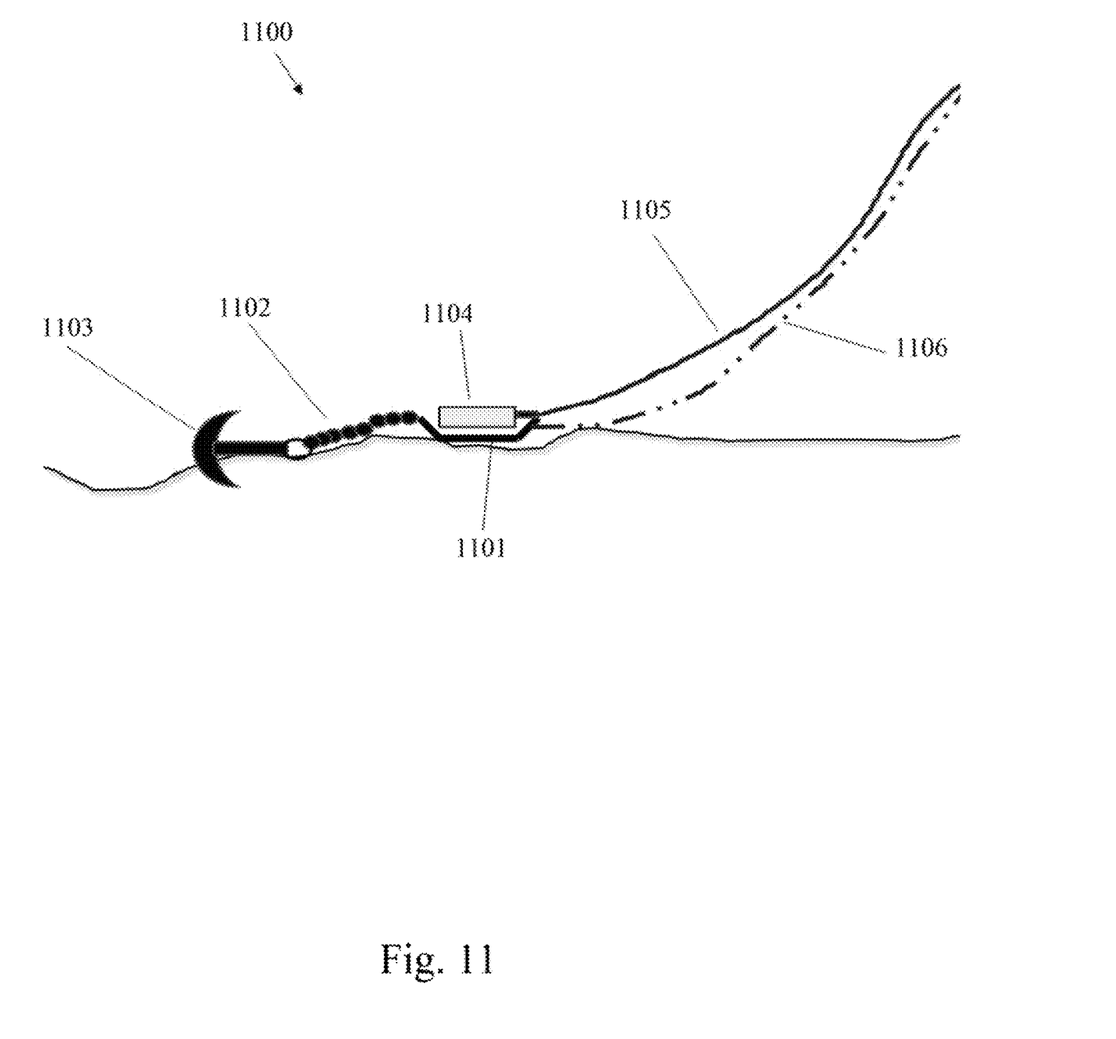
FIG. 11 shows the water anchor and diffuser system incorporated in the system.

FIG. 11 shows generally the under-water anchor and diffuser system (1100). After dropped to the bottom of the water, diffuser plate (1101) sits on the bottom of the water feature. Extension metal chain (1102) and anchor (1103) lock down to the pre-selected location. Diffuser (1104) connects to air hose (1105) with the upper end attaching to the floating base (not shown). Anchor cable (1106) is wrapped with or tied to air hose (1105).

Therefore, the foregoing embodiments are considered as illustrative only of the principles of the invention. Further, since modification and changes will readily occur to those skilled in the art, it is not desired to limit the invention to the exact construction and operation shown and described, and accordingly, all suitable modifications and equivalents may be resorted to, falling within the scope of the invention.

What is claimed is:
1. A landed-based water aeration system, comprising:
   a pole secured to a portion of land;
   a frame coupled to the pole;
   a solar panel coupled to the frame;
   an encasement coupled to the pole;
   a controller housed within the encasement;
   an air compressor housed within the encasement and electrically coupled to the controller;
   one or more diffusers submerged under water;
   an air hose pneumatically coupling the air compressor and the one or more diffusers;
   one or more horizontal frame rails;
   one or more slotted vertical frame rails coupled to the one or more horizontal frame rails;
   a mounting bracket coupled to the one or more horizontal frame rails; and
   an adjustable edge lock slidably engaged to the one or more slotted vertical frame rails for fitment to differently sized solar panels.

2. The landed-based water aeration system of claim 1 wherein the encasement further comprises a layer of rubber under an upper clamp to secure the solar panels coupled to the one or more slotted vertical frame rails.

3. The landed-based water aeration system of claim 1, the encasement further comprising:
   an air inlet filter, the encasement having an air compressor outlet and having a power cord inlet, wherein air flows through the air inlet filter past the controller and into the air compressor, the air compressor outlet is ported through the encasement, and the power cord inlet is ported through the encasement.

4. The landed-based water aeration system of claim 3 further comprising:
   a base housed within the encasement; and
   a top cover coupled to the encasement utilizing removable sealant for installation and maintenance,
   wherein the encasement further comprises at least one of extruded and welded sheet metal, and
   wherein the air compressor is attached to the base with an isolator and the controller mounted to a side wall of the encasement.

5. The landed-based water aeration system of claim 4 wherein the air compressor has a linear diaphragm air compressor drive unit with a winding number on a set of coils modified to operate at 30 volts AC, wherein the set of coils are connected in parallel.

6. The landed-based water aeration system of claim 4, the controller further comprising:
   an integrated DC/DC booster;
   a DC/AC inverter; and
   a micro control processor (MCP) including firmware programmed into the MCP to operate the aeration system to monitor a performance and adjust input/output voltage and frequency; and
   a PCB electrically coupled the DC/DC booster, the DC/AC inverter and the MCP;
   a plurality of power connectors coupled to the PCB including connectors to the solar panel and the air compressor; and wherein the encasement fully seals the PCB, the DC/DC booster, the DC/AC inverter, the MCP and the plurality of power connectors.

7. The landed-based water aeration system of claim 6 wherein the DC/DC booster increases a solar panel output voltage to 45 volts DC and wherein the DC/DC booster is modularized to match a quantity of solar panels while retaining the DC/AC inverter and the MCP.

8. The landed-based water aeration system of claim 6 wherein the DC/AC inverter converts a 45 volt DC to 30 volt AC with variable frequency.

9. The landed-based water aeration system of claim 6 wherein the encasement fully seals electronics therein, has an input power line with an MC4 solar panel connector, a linear diaphragm air compressor drive output power line connector, and a metal base acts as a mounting bracket and a heat sink.

10. The landed-based water aeration system of claim 6 wherein the firmware:
monitors a solar panel power output and adjusts an input voltage to increase power generation;
monitors the solar panel, the controller and the air compressor and alarms and shuts down defective modules; and
records system performance data.

11. The landed-based water aeration system of claim 1 wherein the mounting bracket forms a 30 to 45 degrees bend to support the one or more horizontal frame rails, the mounting bracket is mounted to the pole with U-shaped bolts and has an upper portion of a mounting bracket plate bent inward to act as a stop and support during installation.

12. A floating aeration system, comprising:
a floating base;
an anchor system securing the floating base;
a metal frame affixed to the floating base;
a metal pole affixed to the metal frame;
a plurality of solar panels affixed to the metal frame to provide electrical power;
an encasement coupled to the metal pole;
a controller housed within the encasement;
an air compressor housed within the encasement and electrically coupled to the controller;
one or more diffusers submerged under water;
an air hose pneumatically coupling the air compressor and the one or more diffusers; and
a lightning rod cap coupled to the metal pole.

13. The floating aeration system of claim 12 wherein the floating base is comprised of expanded polystyrene (EPS) plastic material and a shape of the floating base is one of square and round.

14. The floating aeration system of claim 12 wherein the metal frame is comprised of aluminum.

15. The floating aeration system of claim 12 wherein the metal pole supports a top plate and the encasement with the lower portion under water attached with a counter weight.

16. The floating aeration system of claim 12 wherein the plurality of solar panels is mounted to a top plate and a lower base and wherein a shape of the plurality of solar panels is one of rectangular, triangular and trapezoidal.

17. The floating aeration system of claim 12 wherein the anchor system is attached at one end to a base plate and includes two or more cables with dead weights or anchors submerged under water.

18. The floating aeration system of claim 12 wherein the one or more diffusers are connected with the air hose coupled to a set of anchor system cables.

19. The floating aeration system of claim 12 where the lightning rod cap is formed in a shape of a pyramid with a spike and wherein the lightning rod cap is attached to a top of the metal pole.

* * * * *